United States Patent
Ponnaluri et al.

(10) Patent No.: US 7,330,363 B2
(45) Date of Patent: Feb. 12, 2008

(54) CONVERTER CIRCUIT WITH TWO CONVERTER ELEMENTS

(75) Inventors: Srinivas Ponnaluri, Untersiggenthal (CH); Jürgen Steinke, Albbruck (DE); Peter Steimer, Unterehrendingen (CH)

(73) Assignee: ABB Schweiz AG, Baden (CH)

( * ) Notice: Subject to any disclaimer, the term of this patent is extended or adjusted under 35 U.S.C. 154(b) by 42 days.

(21) Appl. No.: 10/583,315

(22) PCT Filed: Dec. 13, 2004

(86) PCT No.: PCT/CH2004/000735

§ 371 (c)(1),
(2), (4) Date: Jun. 15, 2006

(87) PCT Pub. No.: WO2005/060081

PCT Pub. Date: Jun. 30, 2005

(65) Prior Publication Data

US 2007/0121348 A1    May 31, 2007

(30) Foreign Application Priority Data

Dec. 16, 2003    (EP) .................................. 03405899

(51) Int. Cl.
*H02M 7/00*     (2006.01)
*H01F 30/12*    (2006.01)
*H02M 7/5387*   (2006.01)

(52) U.S. Cl. ........................................ 363/71; 323/361

(58) Field of Classification Search .................. 363/16, 363/17, 65, 71, 95, 98, 131, 132; 323/207, 323/208, 355, 361
See application file for complete search history.

(56) References Cited

U.S. PATENT DOCUMENTS 3,546,572 A    12/1970    Specht et al.

(Continued)

FOREIGN PATENT DOCUMENTS

| DE | 101 34 883 A1 | 1/2003 |
| EP | 0 440 988 A1 | 8/1991 |
| EP | 0 584 660 A2 | 3/1994 |
| WO | WO 03/084048 A1 | 10/2003 |

OTHER PUBLICATIONS

International Preliminary Report on Patentability with attached Written Opinion of the International Searching Authority (in English), issued in PCT/CH2004/000735 on Sep. 8, 2006, The International Bureau of WIPO, Geneva, CH.

*Primary Examiner*—Matthew V. Nguyen
(74) *Attorney, Agent, or Firm*—Buchanan Ingersoll & Rooney PC

(57)    ABSTRACT

A converter circuit having a first and a second converter element is specified, with each converter element having a DC voltage circuit and in each case one converter element phase (u1, v1, w1) of the first converter element being connected to a respective converter element phase (u2, v2, w2) of the second converter element. Furthermore, a transformer is provided, with the secondary windings of the transformer being connected to the connected converter element phases (u1, v1, w1, u2, v2, w2) of the first and second converter elements. In order to ensure that virtually no amplitude components relating to the switching frequency of the converter circuit occur during its operation in the output currents of the converter circuit and in the output voltages of the converter circuit, one secondary winding is in each case connected in series in each connection of one converter element phase (u1, v1, w1) of the first converter element to one converter element phase (u2, v2, w2) of the second converter element, in which case each secondary winding is formed by two winding elements connected in series with one another, with the junction point of the two winding elements forming a neutral-point connection, and two filter capacitors which are connected in series with one another are in each case connected in parallel with each secondary winding.

9 Claims, 11 Drawing Sheets

U.S. PATENT DOCUMENTS

| | | |
|---|---|---|
| 5,005,100 A | 4/1991 | Owen |
| 5,142,468 A * | 8/1992 | Nerem ........................ 363/71 |
| 5,852,553 A | 12/1998 | Stacey |
| 5,984,173 A * | 11/1999 | Edwards ..................... 323/207 |
| 6,233,996 B1 | 5/2001 | Klug et al. |
| 6,340,851 B1 * | 1/2002 | Rinaldi et al. ................. 307/82 |
| 6,737,837 B1 * | 5/2004 | Halvarsson et al. ........ 323/205 |
| 6,747,881 B2 * | 6/2004 | Schreiber ..................... 363/37 |
| 2007/0121353 A1 * | 5/2007 | Zhang et al. ................. 363/39 |

* cited by examiner

CONVERTER CIRCUIT WITH TWO CONVERTER ELEMENTS

TECHNICAL FIELD

The invention relates to the field of power electronics, and in particular to a converter circuit as claimed in the precharacterizing clause of the independent claim.

PRIOR ART

High-power voltage converter circuits are used in many applications nowadays. A converter circuit such as this has two converter elements, for example, for this purpose, with each converter element having a DC voltage circuit which is formed by a capacitor. Furthermore, each converter element has power semiconductor switches which are normally connected in such a manner that two switching voltage levels, specifically the positive intermediate circuit voltage and the negative intermediate circuit voltage, can be connected to the converter element phases of the associated converter element. Each converter element normally has three converter element phases, with one converter element phase of the first converter element in each case being connected to in each case one converter element phase of the second converter element. The conventional three-phase converter circuit mentioned above is illustrated in FIG. 1a. As can be seen from FIG. 1a, a three-phase transformer is also provided, with the secondary windings of the transformer being connected to the connected converter element phases of the first and second converter element. In this case, in the converter circuit that is shown in FIG. 1a, a first connection of each secondary winding is in each case connected to in each case one connection of two converter element phases. The respective second connections of the secondary windings are connected to a conventional star circuit. The primary winding are likewise connected to a conventional star circuit, as shown in FIG. 1a. For operation of the converter circuit, an inductance is provided in each converter element phase of the first and second converter elements, and is used to produce a phase voltage (which is sinusoidal in the widest sense) of the associated converter element phase of the respective converter element. Furthermore, the semiconductor switches of the first and second. converter elements are controlled for operation of the converter circuit by switching signals at a predetermined switching frequency, with the switching signals of the first converter element being phase-shifted through 180° with respect to the switching signals for the second converter element. FIG. 1b shows a typical time profile of the output currents of the converter circuit as shown in FIG. 1a, for example on the primary side of the transformer. Furthermore, FIG. 1c shows a frequency spectrum of an output current such as this as shown in FIG. 1b. In addition, FIG. 1d shows a typical time profile of the output voltages of the converter circuit as shown in FIG. 1a, for example on the primary side of the transformer. Finally, FIG. 1e shows a frequency spectrum of an output voltage such as this, as shown in FIG. 1d.

Further conventional converter circuits are disclosed in U.S. Pat. No. 6,233,996 B1, in EP 0 440 988 A1 and in EP 0 584 660 A2.

A conventional converter circuit as shown in FIG. 1a is subject to the problem that the circuitry, that is to say the fact that in each case one connection of each secondary winding is connected to in each case one connection of two converter element phases, results in a very large amplitude component relating to the switching frequency and its odd-numbered multiples, both in the output currents as shown in FIG. 1b and FIG. 1c and in the output voltages as shown in FIG. 1d and FIG. 1e, during operation of the converter circuit as shown in FIG. 1a. These large amplitude components are very highly undesirable, for example, when the converter circuit is connected by means of a transformer to an electrical supply network. A filter capacitor is in each case admittedly provided, is connected to the first connection of each secondary winding, forms a resonant circuit together with the inductance of each phase of the first and second converter elements and makes it possible to achieve a partial reduction in the amplitude component relating to the switching frequency both in the output currents and in the output voltages. However, in order to achieve a certain advantageous reduction in the amplitude component relating to the switching frequency in the output currents and in the output voltages, filter capacitors such as these and the inductances must be designed to have large capacitance and inductance values, respectively, and thus have a large physical size and are heavy, thus requiring a correspondingly large amount of space so that they are thus, overall, very expensive. In addition, the design of the converter circuit and the relevant maintenance of the converter circuit are made more complicated by such large inductances and filter capacitors, thus incurring additional costs.

DESCRIPTION OF THE INVENTION

The object of the invention is therefore to specify a converter circuit in which virtually no amplitude components relating to the switching frequency of the converter circuit occur during its operation in the output currents of the converter circuit and in the output voltages of the converter circuit. This object is achieved by the features of claim 1. Advantageous developments of the invention are specified in the dependent claims.

The converter circuit according to the invention has a first and a second converter element, with each converter element having a DC voltage circuit and in each case one converter element phase of the first converter element being connected to a respective converter element phase of the second converter element. Furthermore, the converter circuit according to the invention has a transformer, with the secondary windings of the transformer being connected to the connected converter element phases of the first and second converter elements. Furthermore, one secondary winding in each case is connected in series in each connection of one converter element phase of the first converter element to one converter element phase of the second converter element. According to the invention, each secondary winding is formed by two winding elements connected in series with one another, with the junction point of the two winding elements forming a neutral-point connection. Furthermore, two filter capacitors which are connected in series with one another are in each case connected in parallel with each secondary winding. This respective connection of a secondary winding which is formed by the winding elements advantageously results in a major reduction in amplitude components relating to the switching frequency of the converter circuit during its operation in output currents and in output voltages of the converter circuit, so that these amplitude components virtually do not occur in comparison to conventional converter circuits. Furthermore, amplitude components relating to odd-numbered multiples of the switching frequency can advantageously be likewise greatly reduced by the respective connection of the secondary winding, so that these amplitude components are also very largely suppressed. An electrical supply network which is normally connected to the converter circuit via the transformer is thus advantageously not significantly or only extremely lowly loaded by amplitude components relating to the switching frequency and its odd-numbered multiples. Furthermore, one of the winding elements of one secondary winding together with one of the associated filter capacitors in each case forms a resonant circuit, which is advantageously used to further reduce the amplitude components relating to the switching frequency and its odd-numbered multiples in output currents and in output voltages of the converter circuit. This allows the. overall availability of the converter circuit to be significantly increased.

Furthermore, an energy storage device is specified having a first and a second voltage source, in which the converter circuit according to the invention is provided, and the DC voltage circuit of the first converter element in this case is connected to the first voltage source, and the DC voltage circuit of the second converter element is connected to the second voltage source. In addition to the advantages which have already been mentioned for the converter circuit according to the invention, the energy storage device allows a particularly simple and space-saving design to be created by the use of the converter circuit according to the invention.

Furthermore, a drive system having a first and a second drive converter is specified, which are connected to a rotating electrical machine and in which the converter circuit according to the invention is provided. In this case, the DC voltage circuit of the first converter element is connected to the first drive converter, and the DC voltage circuit of the second converter element is connected to the second drive converter. In addition to the advantages which have already been mentioned for the converter circuit according to the invention, a drive system such as this also allows a particularly simple and space-saving design to be created by the use of the converter circuit according to the invention.

Furthermore, a converter system having a first and a second load converter for feeding an electrical load is specified, in which the converter circuit according to the invention is provided, and the DC voltage circuit of the first converter element is in this case connected to the first load converter, and the DC voltage circuit of the second converter element is connected to the second load converter. In addition to the advantages which have already been mentioned for the converter circuit according to the invention, a converter system such as this also allows a particularly simple and space-saving design to be created by the use of the converter circuit according to the invention.

These and other objects, advantages and features of the present invention will become evident from the following detailed description of preferred embodiments of the invention and in conjunction with the drawing.

Figure 1A:
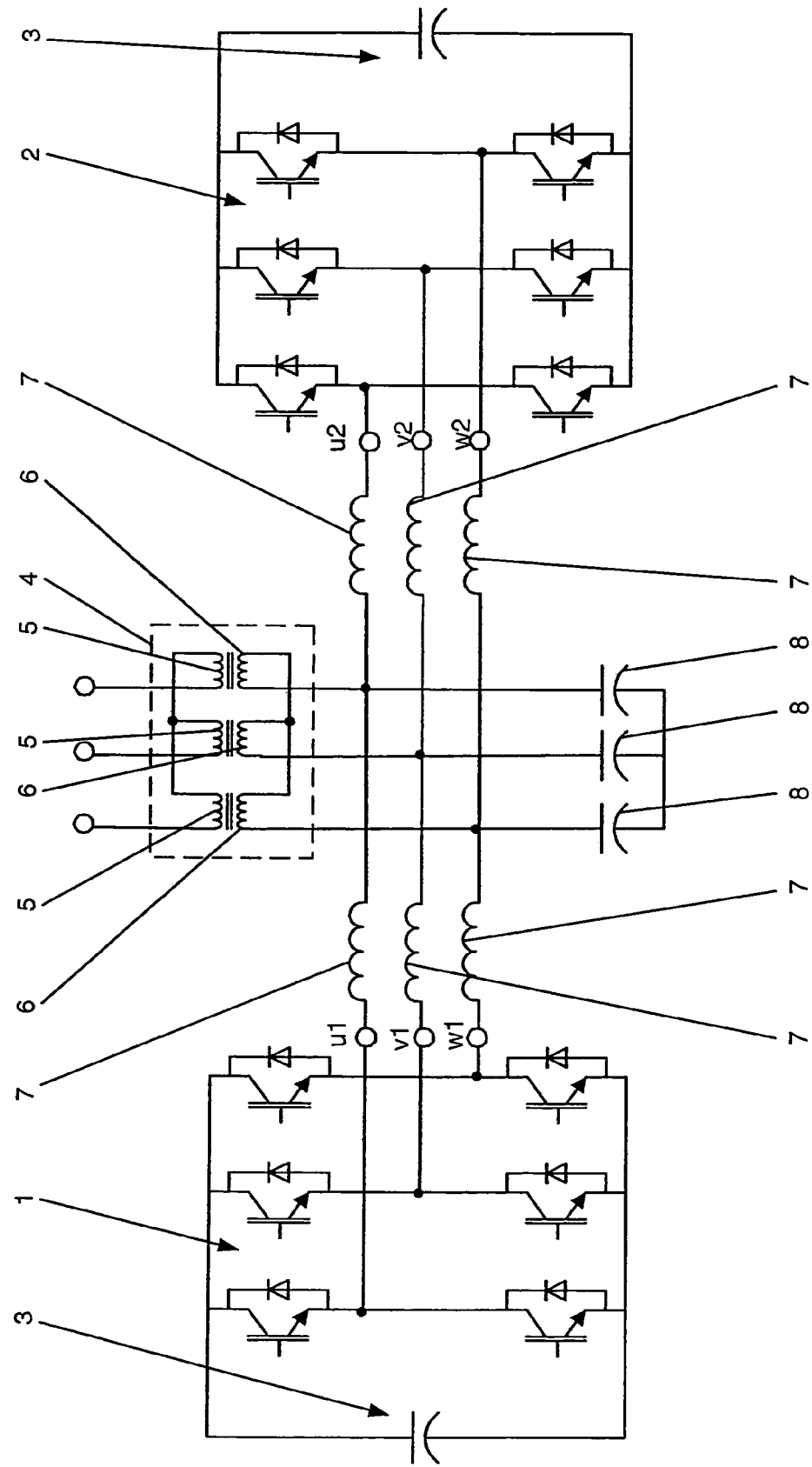
FIG. 1a shows a conventional embodiment of a converter circuit.

The reference symbols used in the drawing and their meanings are listed in summarized form in the list of reference symbols. In principle, identical parts are provided with the same reference symbols in the figures. The described embodiments represent examples of the subject matter of the invention, and have no restrictive effect.

Approaches to Implementation of the Invention

Figure 1C:
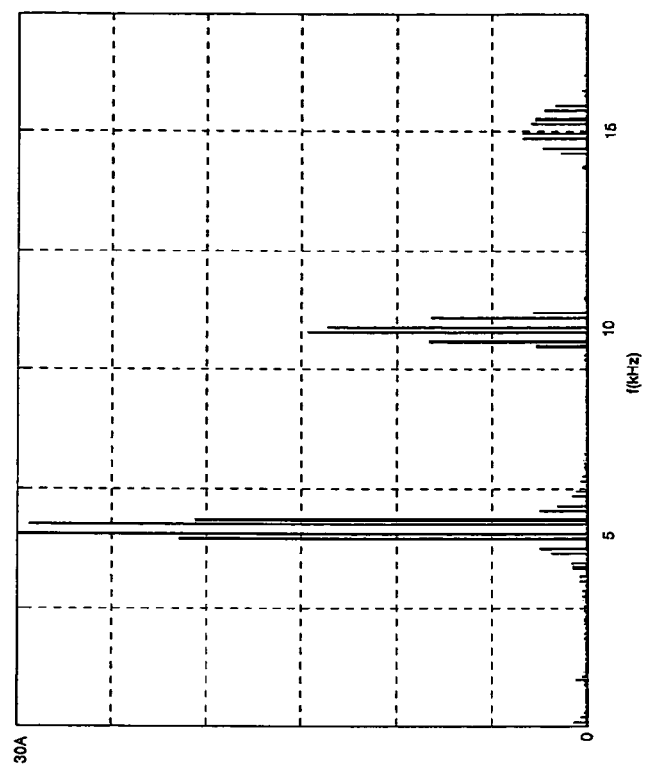
FIG. 1c shows a typical frequency spectrum of an output current as shown in FIG. 1d.
Figure 1B:
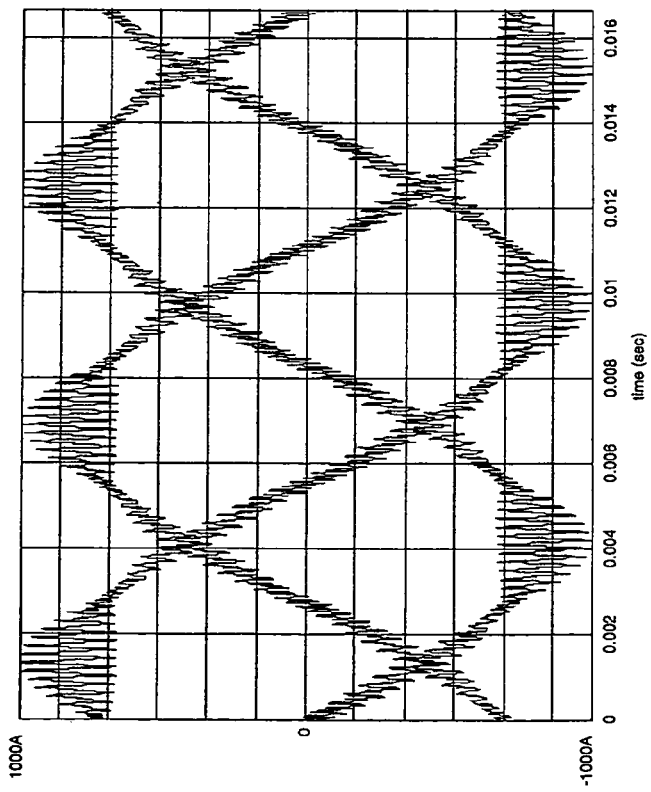
FIG. 1b shows a typical time profile of the output currents from the converter circuit as shown in FIG. 1a on the primary side of the transformer.
Figure 1E:
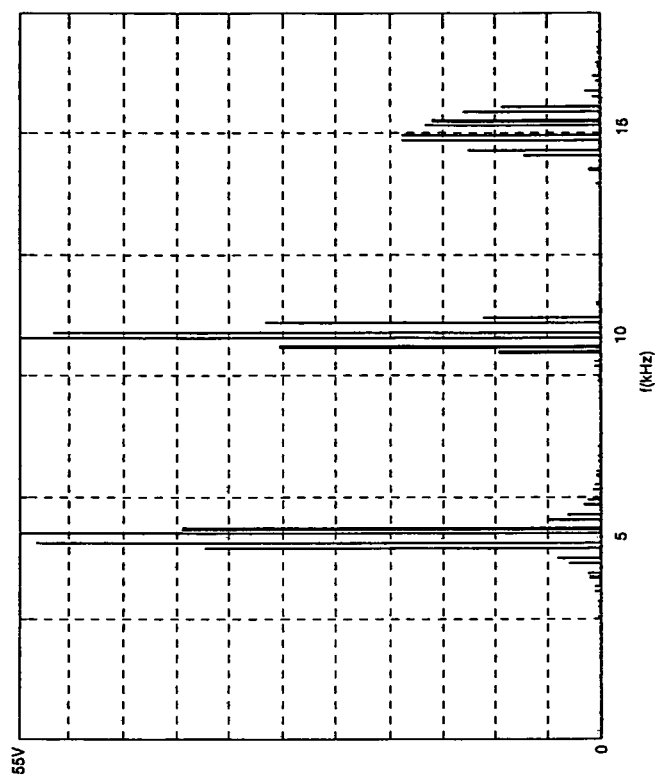
FIG. 1e shows a typical frequency spectrum of an output voltage as shown in FIG. 1d.
Figure 1D:
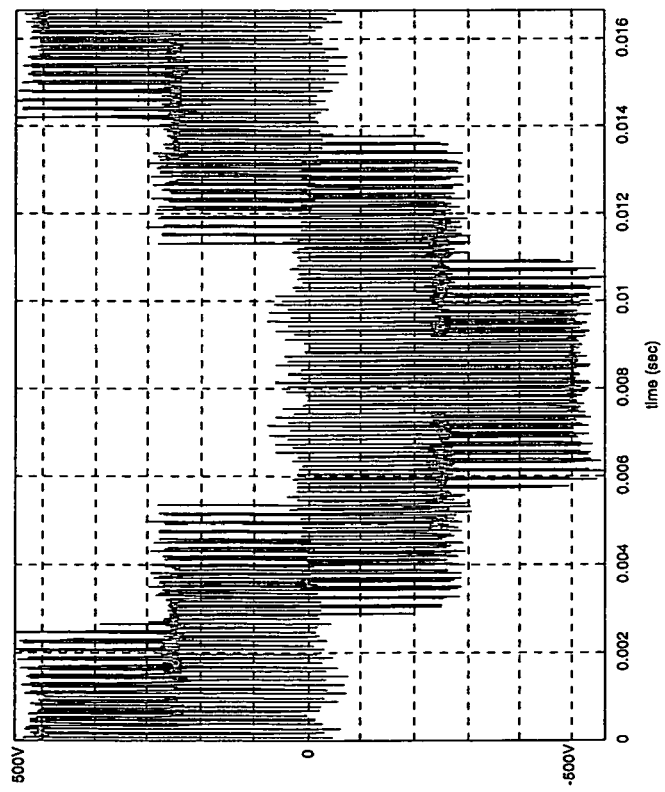
FIG. 1d shows a typical time profile of the output voltages of the converter circuit as shown in FIG. 1a on the primary side of the transformer.
Figure 2A:
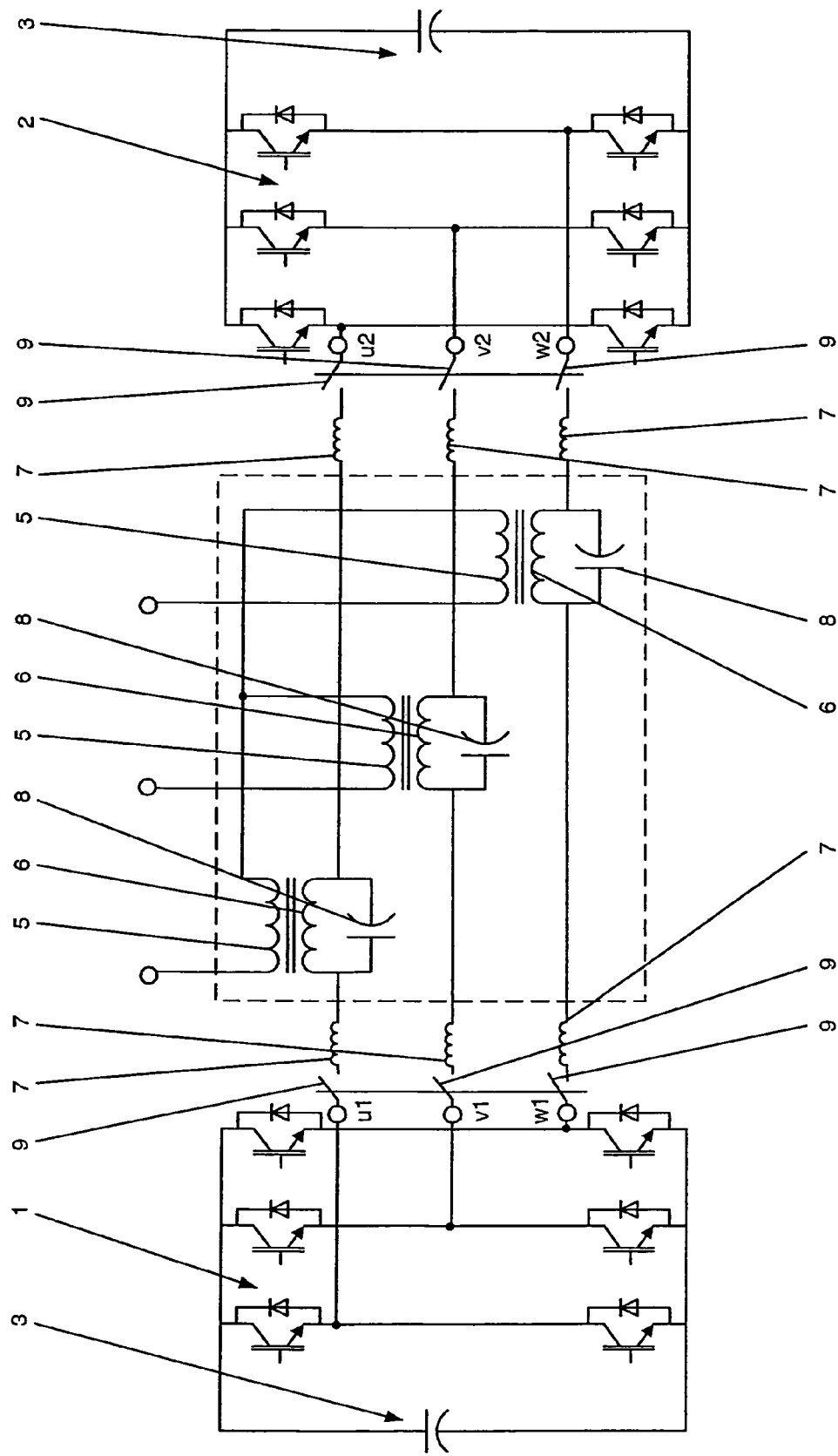
FIG. 2a shows a first embodiment of a converter circuit according to the invention.
Figure 2C:
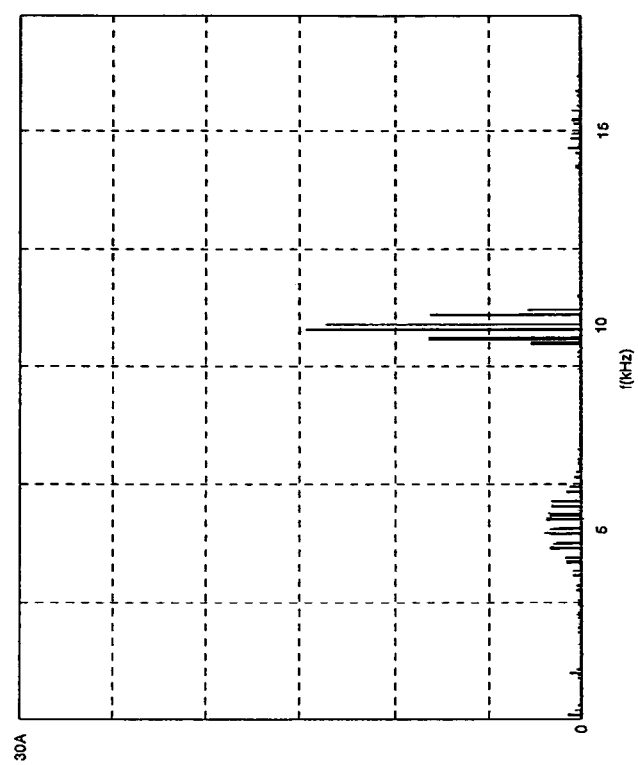
FIG. 2c shows a frequency spectrum of an output current as shown in FIG. 2b.
Figure 2B:
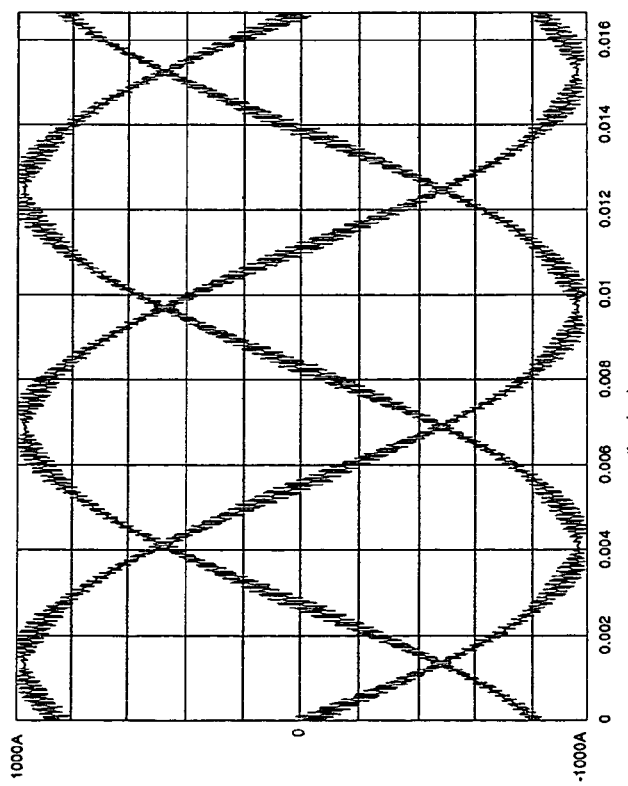
FIG. 2b shows a time profile of the output currents of the converter circuit as shown in FIG. 2a on the primary side of the transformer.
Figure 2E:
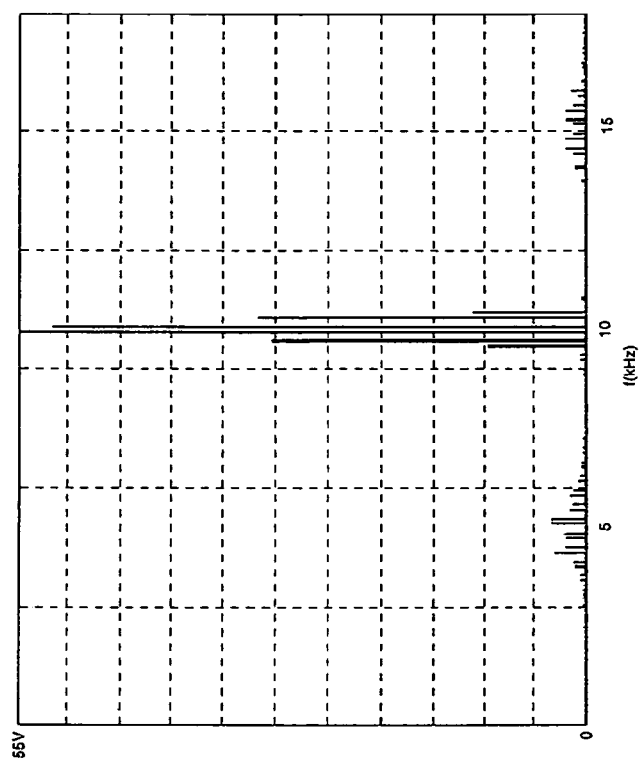
FIG. 2e shows a frequency spectrum of an output voltage as shown in FIG. 2d.
Figure 2D:
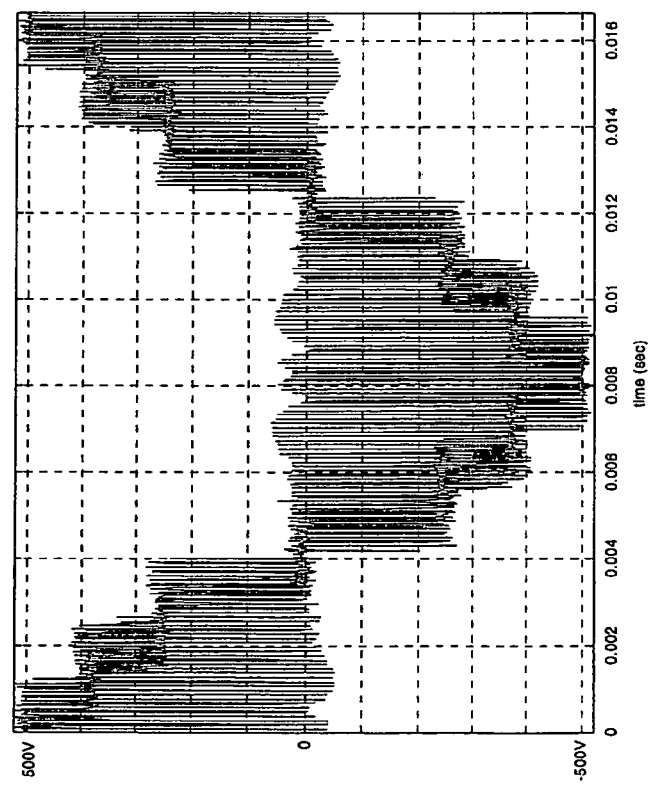
FIG. 2d shows a time profile of the output voltages of the converter circuit as shown in FIG. 2a on the primary side of the transformer.

FIG. 2a shows a first embodiment of a converter circuit according to the invention. The converter circuit comprises a first and a second converter element 1, 2, with each converter element 1, 2 having a DC voltage circuit 3. As shown in FIG. 2a, each converter element 1, 2 is designed to switch two switching voltage levels, specifically the positive DC voltage and the negative DC voltage of the associated DC voltage circuit 3. Then, as shown in FIG. 2a, each DC voltage circuit 3 has a capacitor. However, it is also feasible for each converter element 1, 2 to be designed in general for switching n switching voltage levels, where $n \geq 2$ and where the associated DC voltage circuit 3 is then appropriately designed. As shown in FIG. 2a, one converter element phase u1, v1, w1 of the first converter element 1 is in each case connected to one converter element phase u2, v2, w2 of the second converter element 2. Furthermore, a transformer 4 is provided, with the secondary windings 6 of the transformer 4 being connected to the connected converter element phases u1, v1, w1, u2, v2, w2 of the first and second converter elements 1, 2. As shown in FIG. 2a, a secondary winding 6 is in each case connected in series in each connection of one converter element phase u1, v1, w1 of the first converter element 1 to one converter element phase u2, v2, w2 of the second converter element 2. The semiconductor switches in the first and second converter elements 1, 2 are driven for operation of the converter circuit by switching signals at a predetermined switching frequency, with the switching signals of the first converter element 1 being phase-shifted through 180° with respect to the switching signals of the second converter element 1, and with the switching frequency being, for example, 5 kHz. In this context, FIG. 2b shows the time profile of the output currents of the converter circuit according to the invention as shown in FIG. 2a on the primary side of the transformer 4. Furthermore FIG. 2c shows a frequency spectrum of an output current as shown in FIG. 2b. In addition, FIG. 2d shows a time profile of the output voltages of the converter circuit as shown in FIG. 2a on the primary side of the transformer 4. Finally, FIG. 2e shows a frequency spectrum of an output voltage as shown in FIG. 2d. The respective series connection of a secondary winding 6 in each connection of one converter element phase u1, v1, w1 of the first converter element 1 to one converter element phase u2, v2, w2 of the second converter element 2 advantageously results, as shown in FIG. 2b to FIG. 2e, in a major reduction in the amplitude components relating to the switching frequency of the converter circuit during its operation in output currents and in output voltages of the converter circuit. In comparison to the initially mentioned typical time profile of the output currents as shown in FIG. 1b for the converter circuit according to the prior art, as shown in FIG. 1a with the associated frequency spectrum as shown in FIG. 1c and with the typical time profile of the output voltages as shown in FIG. 1d, that has already been mentioned, for the converter circuit according to the prior art as shown in FIG. 1a with the associated frequency spectrum as shown in FIG. 1e, this reduction of amplitude components relating to the switching frequency is particularly clearly evident, that is to say these amplitude components do not occur in comparison to a conventional converter circuit as shown in FIG. 1a. Furthermore, amplitude components relating to odd-numbered multiples of the switching frequency caused by the respective connection of a secondary winding 6 can likewise advantageously be greatly reduced, so that these amplitude components are also very largely suppressed. This is likewise very clearly shown by the comparison of FIG. 1b to FIG. 1e with FIG. 2b to FIG. 2e. An electrical supply network which is normally connected to the converter circuit via the transformer 4 is thus advantageously not significantly loaded, or is only extremely lowly loaded, by amplitude components relating to the switching frequency and its odd-numbered multiples.

An inductance 7 is preferably connected in series between each converter element phase u1, v1, w1, u2, v2, w2 and the secondary winding 6 for one of the converter elements 1, 2. As shown in FIG. 2a, it may, however, also be advantageous for reason of symmetry for an inductance 7 to be connected in series between each converter element phase u1, v1, w1, u2, v2, w2 and the secondary winding 6 for both converter elements 1, 2. The respective inductance 7 is advantageously used to produce a phase voltage, which is sinusoidal in the widest sense, for the associated converter element phase u1, v1, w1, u2, v2, w2 of the respective converter element 1, 2.

In FIG. 2a, a phase isolating switch 9 is also provided on each converter element phase u1, v1, w1, u2, v2, w2, and is advantageously used for disconnection of the associated converter element 1, 2, for example in the event of a fault in the associated converter element 1, 2, or for maintenance purposes on it. Furthermore, in the case of the first embodiment of the converter circuit according to the invention as shown in FIG. 2a, a filter capacitor 8 is connected in parallel with each secondary winding 6. The respective filter capacitor 8 together with the respective secondary winding 6 and in particular with the inductance 7 forms a resonant circuit, which preferably has a low-pass filter characteristic, with the capacitance of the filter capacitor 8 preferably being designed such that the resonant circuit has a corner frequency at essentially ⅔ of the switching frequency. In the case of the 5 kHz switching frequency which has already been mentioned above by way of example, this would result in the resonant circuit having a corner frequency in the region of 3 kHz. The resonant circuit produced in this way is advantageously used to further reduce the amplitude components relating to the switching frequency and its odd-numbered multiples in the output currents and then output voltages of the converter circuit. The high corner frequency, which is closer to the switching frequency than in the case of the initially already mentioned known resonant circuits, allows the respective filter capacitor 8 and in particular the respective inductance 7 furthermore to be designed to have low capacitance and inductance values, respectively, in comparison to the initially mentioned resonant circuit. This small design thus also advantageously reduces the physical size and the weight of the respective filter capacitor 8 and in particular of the respective inductance 7, and advantageously requires correspondingly less space. Furthermore, the design of the converter circuit is simplified as is the maintenance which may be required for the converter circuit as a result of such small inductances 7 and filter capacitors 8, thus making it possible to save further costs.

Figure 3:
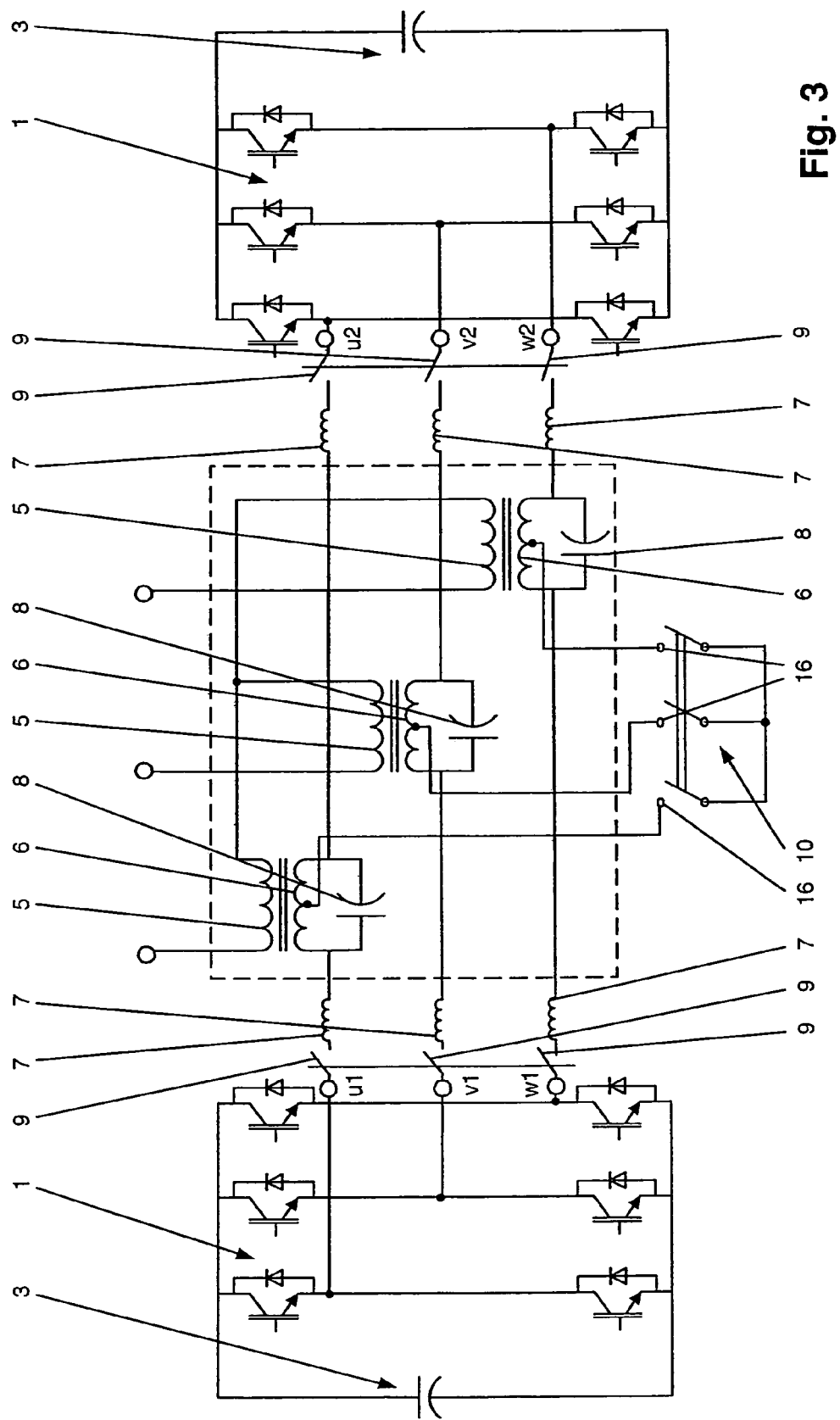
FIG. 3 shows a second embodiment of the converter circuit according to the invention.

FIG. 3 illustrates a second embodiment of the converter circuit according to the invention. In contrast to the embodiment of the converter circuit according to the invention as shown in FIG. 2a, each secondary winding 6 is in this case formed by two winding elements which are connected to one another in series, with the junction point of the two winding elements forming a neutral-point connection 16. Furthermore, in FIG. 3, a connecting switch 10 is provided in order to connect the neutral-point connections 16 to one another. If, by of example, a fault now occurs in the first converter element 1, or it needs to be serviced, then each phase isolating switch 9 for the respective converter element phase u1, v1, w1 of the first converter element 1 is opened, in order to disconnect the first converter element 1. Furthermore, the connecting switch 10 is closed, so that the converter circuit can advantageously still be operated with the second converter element 2, even when the first converter element 1 is disconnected. The availability of the converter circuit can thus be greatly increased overall.

Figure 4:
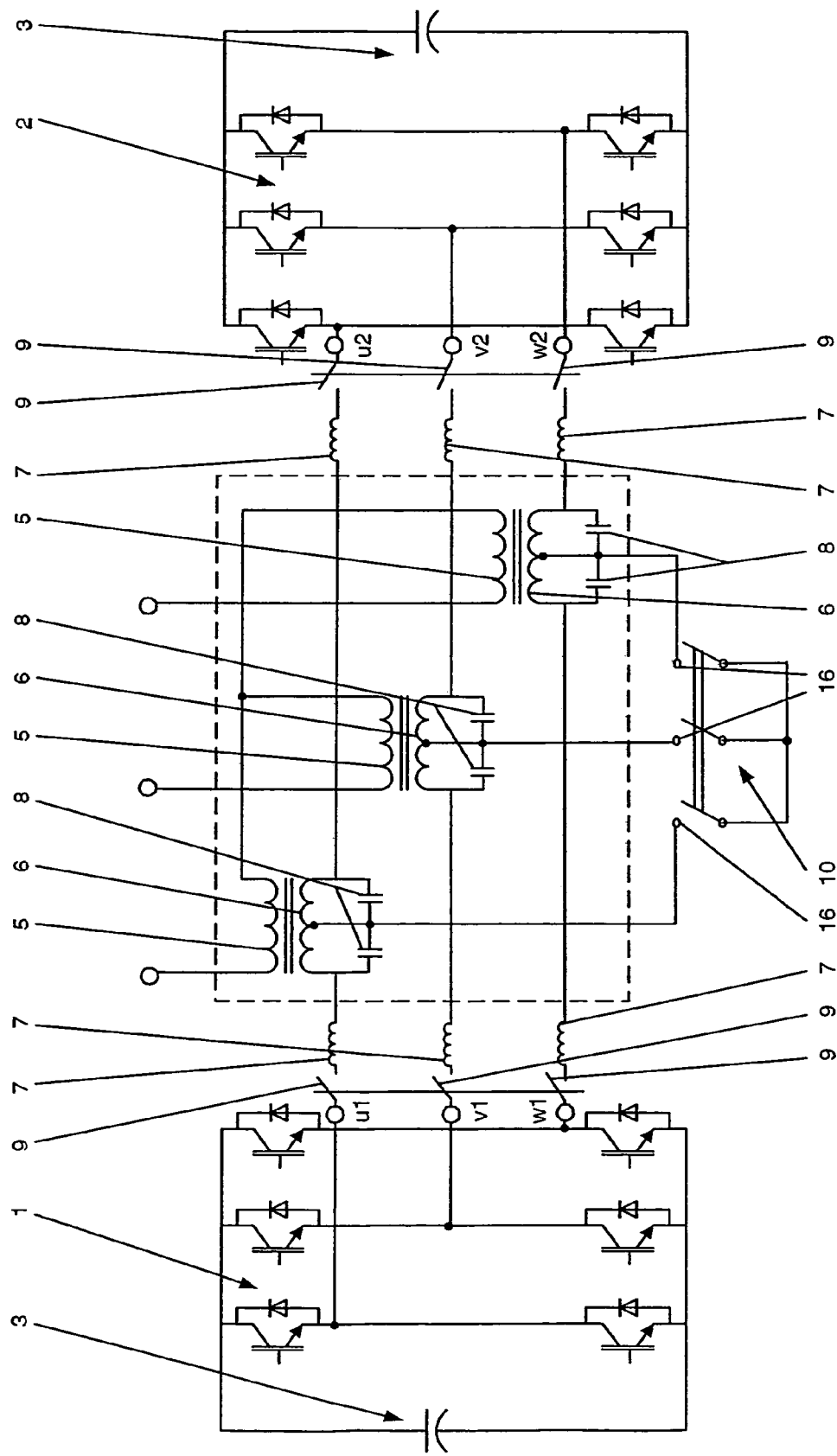
FIG. 4 shows a third embodiment of the converter circuit according to the invention.

FIG. 4 shows a third embodiment of the converter circuit according to the invention. In contrast to the embodiment of the converter circuit according to the invention as shown in FIG. 3, two filter capacitors 8 which are connected in series with one another are in this case each connected in parallel with each secondary winding 6, with the junction point of the two winding elements preferably being connected to the junction point of the two filter capacitors 8, that is to say the junction point of the two filter capacitors 8 is connected to the neutral-point connection 16. One of the winding elements of one secondary winding 6 together with one of the associated filter capacitors 8 and in particular with the inductance 7 in each case advantageously forms a resonant circuit, which is advantageously used to further reduce the amplitude components relating to the switching frequency and its odd-numbered multiples in output currents and in output voltages of the converter circuit. The high corner frequency of this resonant circuit allows the respective filter capacitor 8 and in particular the respective inductance 7 to be designed to be small in comparison to the initially mentioned resonant circuit. This small design thus advantageously also reduces the physical size and the weight of the respective filter capacitor 8 and the respective inductance 7, so that they advantageously require correspondingly less space. Furthermore, the design of the converter circuit is simplified, as is the possibly required maintenance of the converter circuit by such small inductances 7 and filter capacitors 8, thus making it possible to save further costs.

Furthermore, a connecting switch 10 for connection of the neutral-point connections 16 to one another is also provided in the embodiment shown in FIG. 4. As in the case of the embodiment shown in FIG. 3a, in the case of the embodiment shown in FIG. 4, in the event of a fault or for maintenance purposes for example on the first converter element 1, this can be disconnected by opening a respective phase isolating switch 9 for the respective converter element phase u1, v1, w1 of the first converter element 1, and the converter circuit can still be operated by closing the connecting switch 10, using the second converter element 2. In this case, one of the winding elements of the secondary winding 6 is then used to achieve the major reduction (as already explained in detail for the embodiment of the converter circuit according to the invention as shown in FIG. 2a) of amplitude components relating to the switching frequency of the converter circuit during its operation in output currents and in output voltages. With regard to the embodiment shown in FIG. 4, during the continued operation of the converter circuit using, for example, the second converter element 2, as has already been mentioned above with reference to FIG. 3, one of the winding elements of one secondary winding 6 and in particular the inductance 7 of the associated converter element phase u2, v2, w2 of the second converter element 2 is in each case used together with one of the associated filter capacitors 8 to form a resonant circuit, which is advantageously used to further reduce the amplitude components relating to the switching frequency and its odd-numbered multiples in output currents and in output voltages of the converter circuit. The availability of the converter circuit can thus also be greatly increased overall with this embodiment as shown in FIG. 4.

Figure 5:
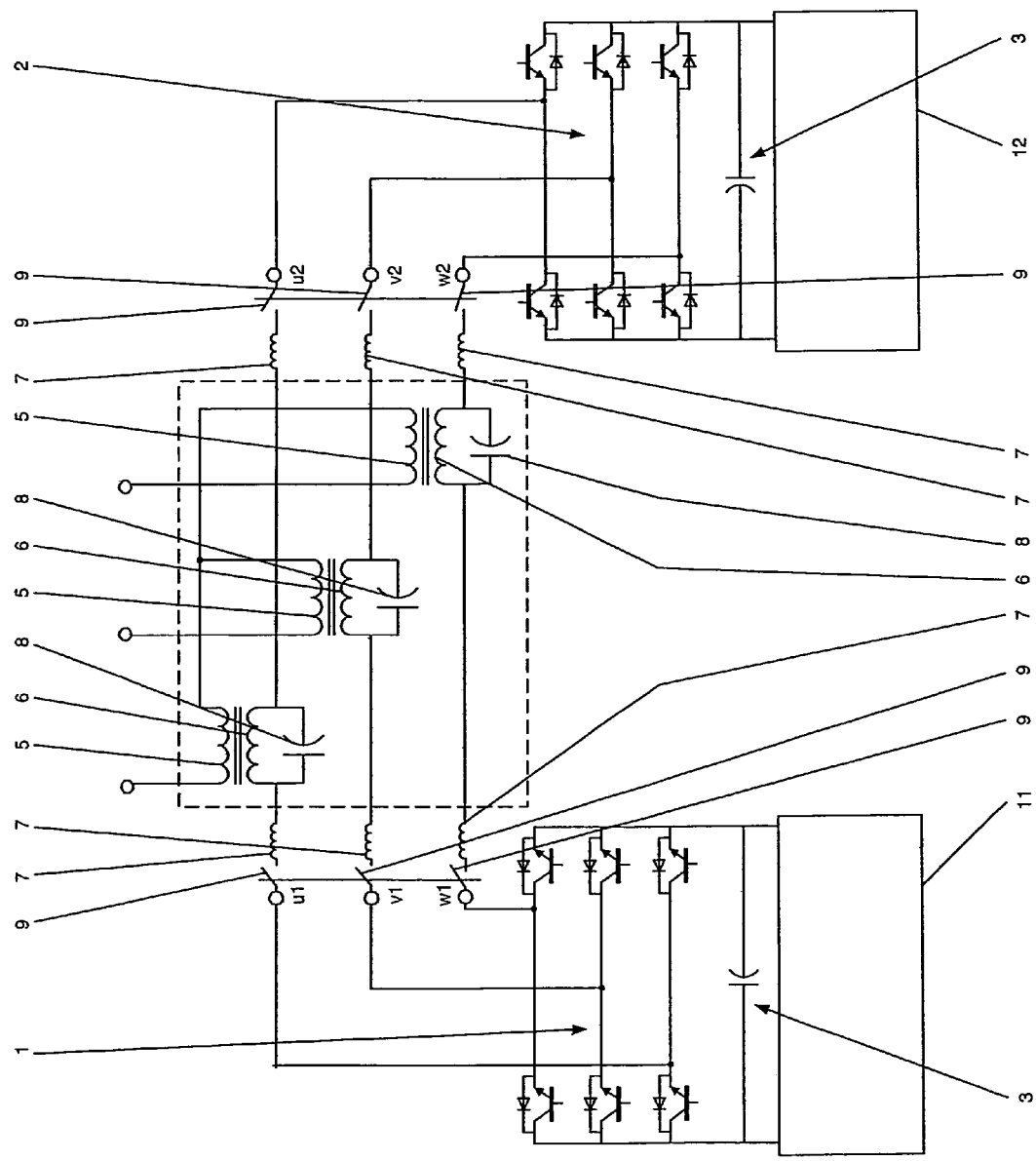
FIG. 5 shows one embodiment of an energy storage device according to the invention.

It has been found to be particularly advantageous for the converter circuit according to the invention, which has been described in detail above with reference to the embodiments shown in FIG. 2a, FIG. 3 and FIG. 4, to be used in an energy storage device with a first and a second voltage source 11, 12. FIG. 5 shows one embodiment of an energy storage device according to the invention such as this, in which the DC voltage circuit 3 of the first converter element 1 is connected to the first voltage source 11, and the DC voltage circuit 3 of the second converter element 2 is connected to the second voltage source 12. In addition to the advantages which have already been mentioned for the converter circuit according to the invention, the energy storage device according to the invention can be designed to be particularly simple, with a space-saving design, by the use of the converter circuit according to the invention.

Figure 6:
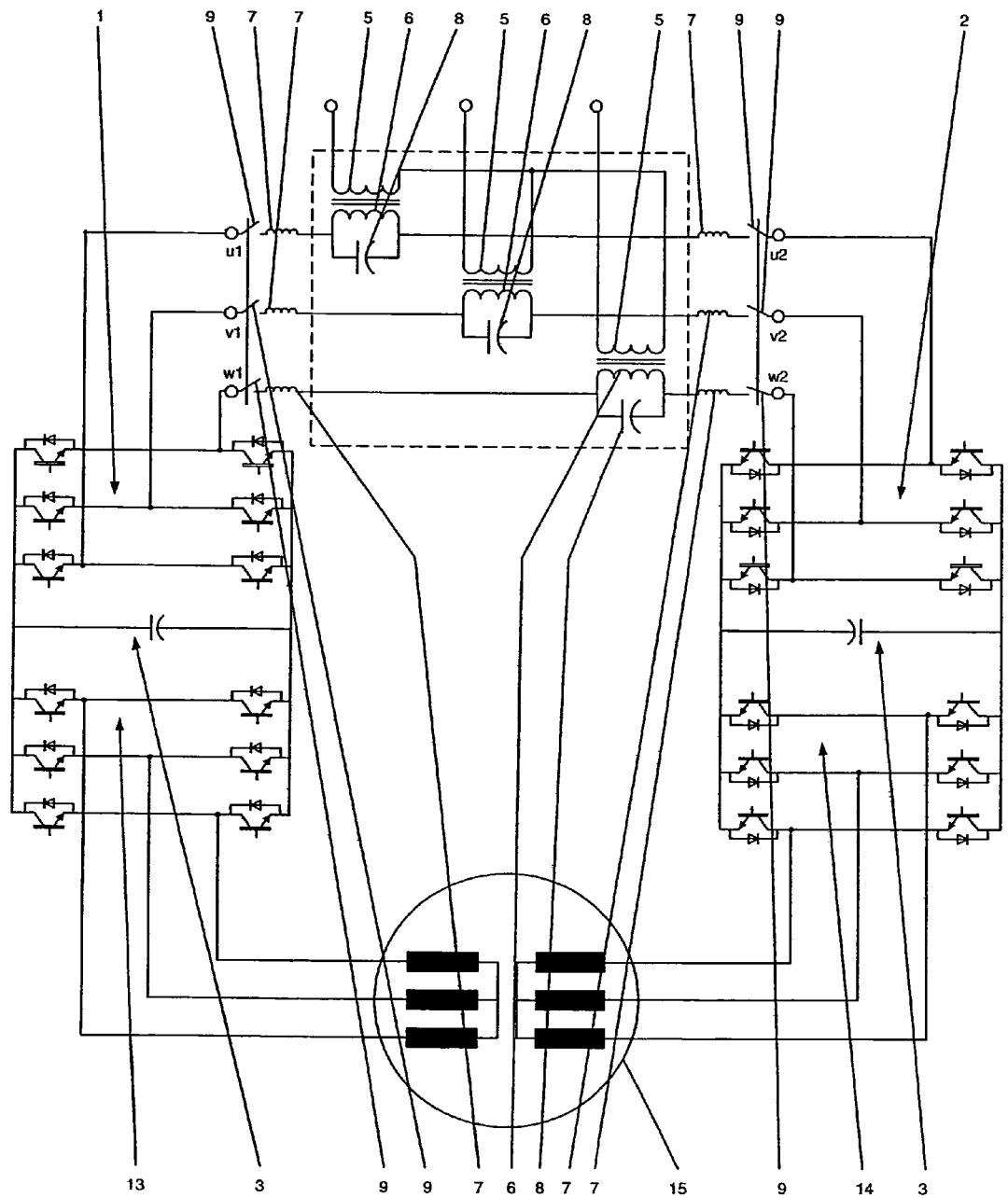
FIG. 6 shows one embodiment of a drive system according to the invention.

Furthermore, it has been found to be advantageous for the converter circuit according to the invention, which has been described in detail above with reference to the embodiments shown in FIG. 2a, FIG. 3 and FIG. 4, to be used in a drive system with a first and a second drive converter 13, 14. FIG. 6 shows one embodiment of a drive system according to the invention such as this. In this case, the first and the second drive converters 13, 14 are connected to a rotating electrical machine 15, in the manner shown in FIG. 5. Furthermore, the DC voltage circuit 3 of the first converter element 1 is connected to the first drive converter 13, and the DC voltage circuit 3 of the second converter element 2 is connected to the second drive converter 14. In addition to the advantages which have already been mentioned for the converter circuit according to the invention, a drive system such as this can also be designed to be particularly simple, with a space-saving design, by the use of the converter circuit according to the invention.

Figure 7:
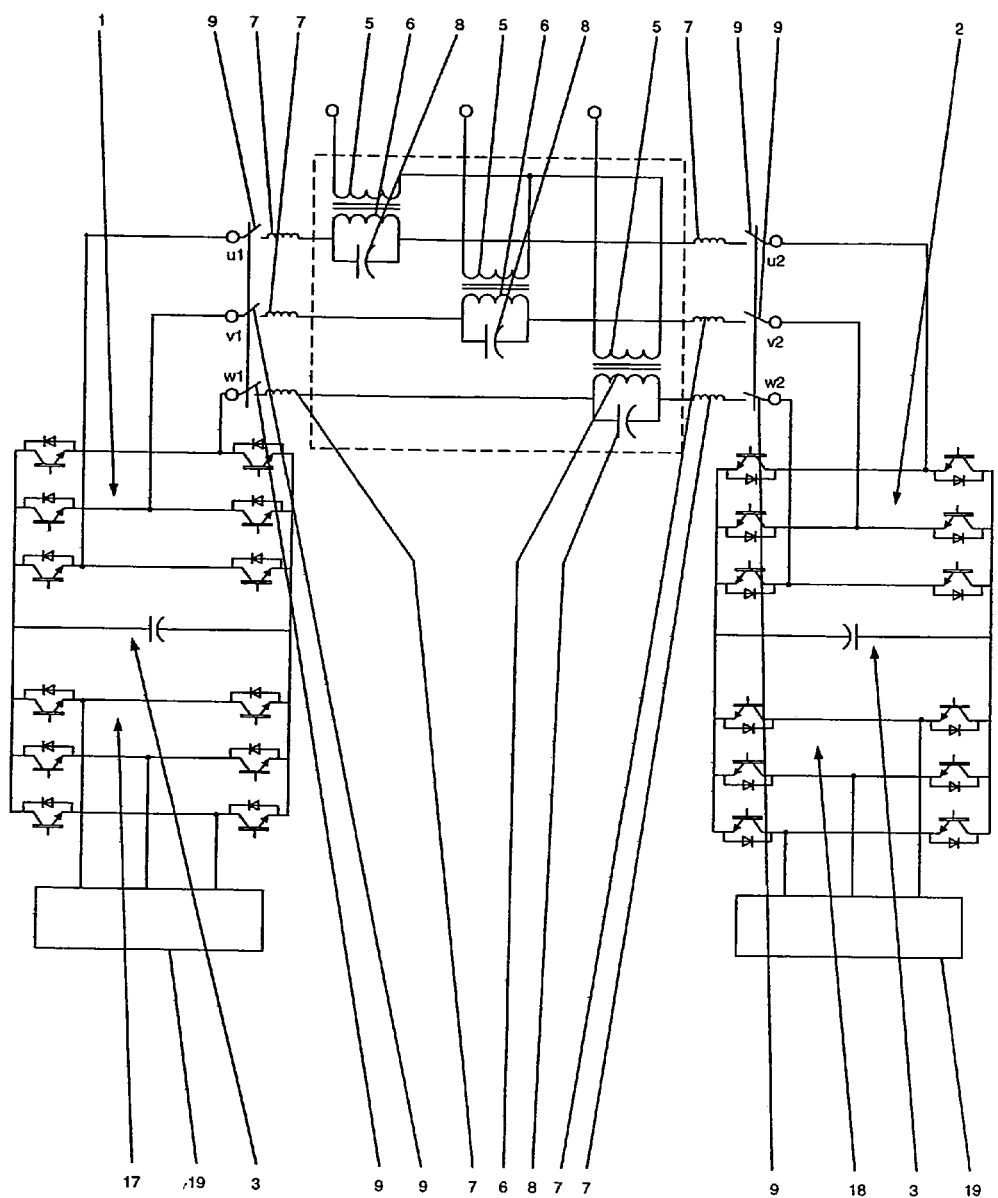
FIG. 7 shows one embodiment of a converter system according to the invention.

Furthermore, it has been found to be advantageous for the converter circuit according to the invention, which has been described in detail above with reference to the embodiments shown in FIG. 2a, FIG. 3 and FIG. 4, to be used in a converter system having a first and a second load converter 17, 18 for feeding an electrical load 19. FIG. 7 shows one embodiment of a general converter system according to the invention such as this. In this case, the DC voltage circuit 3 of the first converter element 1 is connected to the first load converter 17, and the DC voltage circuit 3 of the second converter element 2 is connected to the second load converter 18. As can be seen from FIG. 7, an electrical load 19 is connected to the first load converter 17, and a further electrical load 19 is connected to the second load converter 18. However, it is also feasible for the first load converter 17 and the second load converter 18 to be connected to a single, common electrical load 19. As an alternative to this, it is likewise feasible for each load converter 17, 18 each to be connected to a large number of electrical loads 19, and the first and the second load converter 17, 18 are then connected to one another, in particular via some of the electrical loads 19. In addition to the advantages which have already been mentioned for the converter circuit according to the invention, a converter system such as this can also be designed to be particularly simple, with a space-saving design, by the use of the converter circuit according to the invention.

LIST OF REFERENCE SYMBOLS 1 first converter element
2 second converter element
3 DC voltage circuit
4 transformer
5 primary winding
6 second winding
7 inductance
8 filter capacitor
9 phase isolating switch
10 connecting switch
11 first voltage source
12 second voltage source
13 first drive converter
14 second drive converter
15 rotating electrical machine
16 neutral-point connection
17 first load converter
18 second load converter
19 electrical load

The invention claimed is:

1. A converter circuit having a first and a second converter element, with each converter element having a DC voltage circuit and in each case one converter element phase (u1, v1, w1) of the first converter element being connected to a respective converter element phase (u2, v2, w2) of the second converter element, and having a transformer, with the secondary windings of the transformer being connected to the connected converter element phases (u1, v1, w1, u2, v2, w2) of the first and second converter elements, and with one secondary winding in each case being connected in series in each connection of one converter element phase (u1, v1, w1) of the first converter element to one converter element phase (u2, v2, w2) of the second converter element, wherein
  each secondary winding is formed by two winding elements connected in series with one another, with the junction point of the two winding elements forming a neutral-point connection, and wherein two filter capacitors which are connected in series with one another are in each case connected in parallel with each secondary winding.

2. The converter circuit as claimed in claim 1, wherein an inductance is connected in series between each converter element phase (u1, v1, w1, u2, v2, w2) and the secondary winding for one of the converter elements.

3. The converter circuit as claimed in claim 1, wherein an inductance is connected in series between each converter element phase (u1, v1, w1, u2, v2, w2) and the secondary winding for both converter elements.

4. The converter circuit as claimed in claim 1, wherein a phase isolating sw1tch is provided on each converter element phase (u1, v1, w1, u2, v2, w2).

5. The converter circuit as claimed in claim 1, wherein the junction point of the two filter capacitors is connected to the neutral-point connection.

6. The converter circuit as claimed in claim 1, wherein a connecting sw1tch is provided for connecting the neutral-point connections to one another.

7. An energy storage device having a first and a second voltage source wherein a converter circuit as claimed in any one of claims 1 to 6 is provided, and the DC voltage circuit of the first converter element is connected to the first voltage source, and the DC voltage circuit of the second converter element is connected to the second voltage source.

8. A drive system having a first and a second drive converter, which are connected to a rotating electrical machine, wherein a converter circuit as claimed in any one of claims 1 to 6 is provided, and the DC voltage circuit of the first converter element is connected to the first drive converter, and the DC voltage circuit of the second converter element is connected to the second drive converter.

9. A converter system having a first and a second load converter for feeding an electrical load, wherein a converter circuit as claimed in any one of claims 1 to 6 is provided, and the DC voltage circuit of the first converter element is connected to the first load converter, and the DC voltage circuit of the second converter element is connected to the second load converter.

* * * * *